United States Patent
Kolesnik et al.

(10) Patent No.: US 11,038,765 B2
(45) Date of Patent: Jun. 15, 2021

(54) CLOUD SOFTWARE DEFINED NETWORKING APPLICATION PROGRAMMING INTERFACE CONVERTER

(71) Applicant: Red Hat Israel, Ltd., Ra'anana (IL)

(72) Inventors: Michael Kolesnik, Ra'anana (IL); Alona Kaplan, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 14 days.

(21) Appl. No.: 15/994,317

(22) Filed: May 31, 2018

(65) Prior Publication Data

US 2019/0372854 A1  Dec. 5, 2019

(51) Int. Cl.
| | |
|---|---|
| *H04L 12/24* | (2006.01) |
| *G06F 9/54* | (2006.01) |
| *G06F 9/50* | (2006.01) |
| *H04L 12/715* | (2013.01) |

(52) U.S. Cl.
CPC .............. *H04L 41/12* (2013.01); *G06F 9/547* (2013.01); *H04L 41/22* (2013.01); *G06F 9/5077* (2013.01); *H04L 45/64* (2013.01)

(58) Field of Classification Search
CPC ......... H04L 41/12; H04L 41/22; H04L 45/64; G06F 9/547; G06F 9/5077
USPC ....................................................... 709/223
See application file for complete search history.

(56) References Cited

U.S. PATENT DOCUMENTS

| | | |
|---|---|---|
| 9,122,422 B2 | 9/2015 | Johnston et al. |
| 9,686,162 B2 | 6/2017 | Singh et al. |
| 10,496,429 B2 * | 12/2019 | Alexandrov ........ G06F 9/45558 |
| 2013/0145367 A1 * | 6/2013 | Moss ....................... H04L 43/04 718/1 |
| 2016/0112269 A1 * | 4/2016 | Singh .................. H04L 41/0853 709/224 |
| 2016/0246692 A1 * | 8/2016 | Kaplan ................. G06F 11/203 |
| 2016/0253194 A1 * | 9/2016 | Kolesnik ............. G06F 9/45558 718/1 |
| 2017/0006082 A1 | 1/2017 | Shishodia |
| 2017/0134237 A1 * | 5/2017 | Yang ................... H04L 41/0816 |
| 2017/0364381 A1 * | 12/2017 | Suber .................. G06F 9/45541 |

OTHER PUBLICATIONS

"SDN-based virtual Machine Management for cloud data center" Richard et al Jan. 18, 2015, 14 pages. (Year: 2015).*

(Continued)

*Primary Examiner* — Tauqir Hussain
(74) *Attorney, Agent, or Firm* — Womble Bond Dickinson (US) LLP

(57) ABSTRACT

A method includes identifying a cloud and virtualization management system application programming interface (API), and identifying a software defined networking (SDN) API. The method further includes determining, by a processing device, one or more resources, relationships, or fields corresponding to the cloud and virtualization management system API and the SDN API. The method further includes generating, by the processing device, a skeleton model representing mappings between the one or more resources, relationships, or fields corresponding to the cloud and virtualization management system API and the SDN API. The method further includes and providing the skeleton model to a client device for display.

17 Claims, 6 Drawing Sheets

(56) References Cited

OTHER PUBLICATIONS

Cziva et al., "SDN-based Virtual Machine Management for Cloud Data Centers", IEEE Transactions on Network and Service Management, Jan. 18, 2015, 14 pages.

Ong et al. "The Materials Application Programming Interface (API): A simple, flexible and efficient API for materials data based on REpresentational State Transfer (REST) principles", Computational Materials Science, vol. 97, 2015, pp. 209-215.

Son, Jungmin, "Integrated Provisioning of Compute and Network Resources in Software-Defined Cloud Data Centers", School of Computing and Information Systems, The University of Melbourne, Jan. 2018, 206 pages.

Zhou et al., "Rest API Design Patterns for SDN Northbound API", Shannon (IT) Laboratory, Huawei Technologies Co., Ltd., 8 pages.

\* cited by examiner

CLOUD SOFTWARE DEFINED NETWORKING APPLICATION PROGRAMMING INTERFACE CONVERTER

TECHNICAL FIELD

Aspects of the present disclosure relate to application programming interfaces (APIs), and more particularly, to cloud software defined networking (SDN) API converters.

BACKGROUND

Applications which are used by users for various purposes may be implemented using various paradigms. For example, an application may be installed and/or executed on a computing device (e.g., a tablet computer, a smartphone, a laptop computer, a desktop computer, etc.) of a user. A web application (also referred to herein as a web app) may be an application that uses a client-server model where the user interface of the application is presented by a web browser of a client device and where the actions, operations, functions, methods, calculations, etc., of the web application are generally performed by a server computing device. Examples of a web application may include, but are not limited to a messaging application, a video application, a social networking application, a video sharing application, a photo sharing application, a chat application, a content (e.g., video, music, etc.) delivery application, or any combination of such applications. A web application may be a computationally large or data-intensive application, such as a forecasting application, a modeling application, a data analysis application, etc. Web applications may also be referred to as Software as a Service (SaaS) applications.

Users may interact with a web application, or any other application hosted by a remote server, via an application program interface (API), which may define functionality allowed by the remote server. APIs may be presented to a user using a web page that is rendered by a web browser of a client device, or via a standalone application. A web page may include markup language such as hypertext markup language (HTML). The web page may also include various resources or objects, such as scripts, images, video, text, style sheets, etc. The web application may be divided into multiple components, which may be referred to as web application components or micro applications. Each web application component may perform different functions, operations, actions, processes, methods, etc., for the web application and/or may provide different services, functionalities, and/or resources for the web application. In some implementations of web applications, each web application component may be accessed by a web browser using a different uniform resource locator (URL). In other implementations of web applications, a single web page may be loaded by the web browser and the webpage may be dynamically updated as the user interacts with the web application (also referred to as single-page web application). Various programming languages and/or runtime environments may be used to implement the components of a web application. For example, the components of the web application may be implemented using JAVA, JavaScript, Perl, Python, etc. Client devices, on which API UIs may be provided, may interact with the server computing device via the UI of the API.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
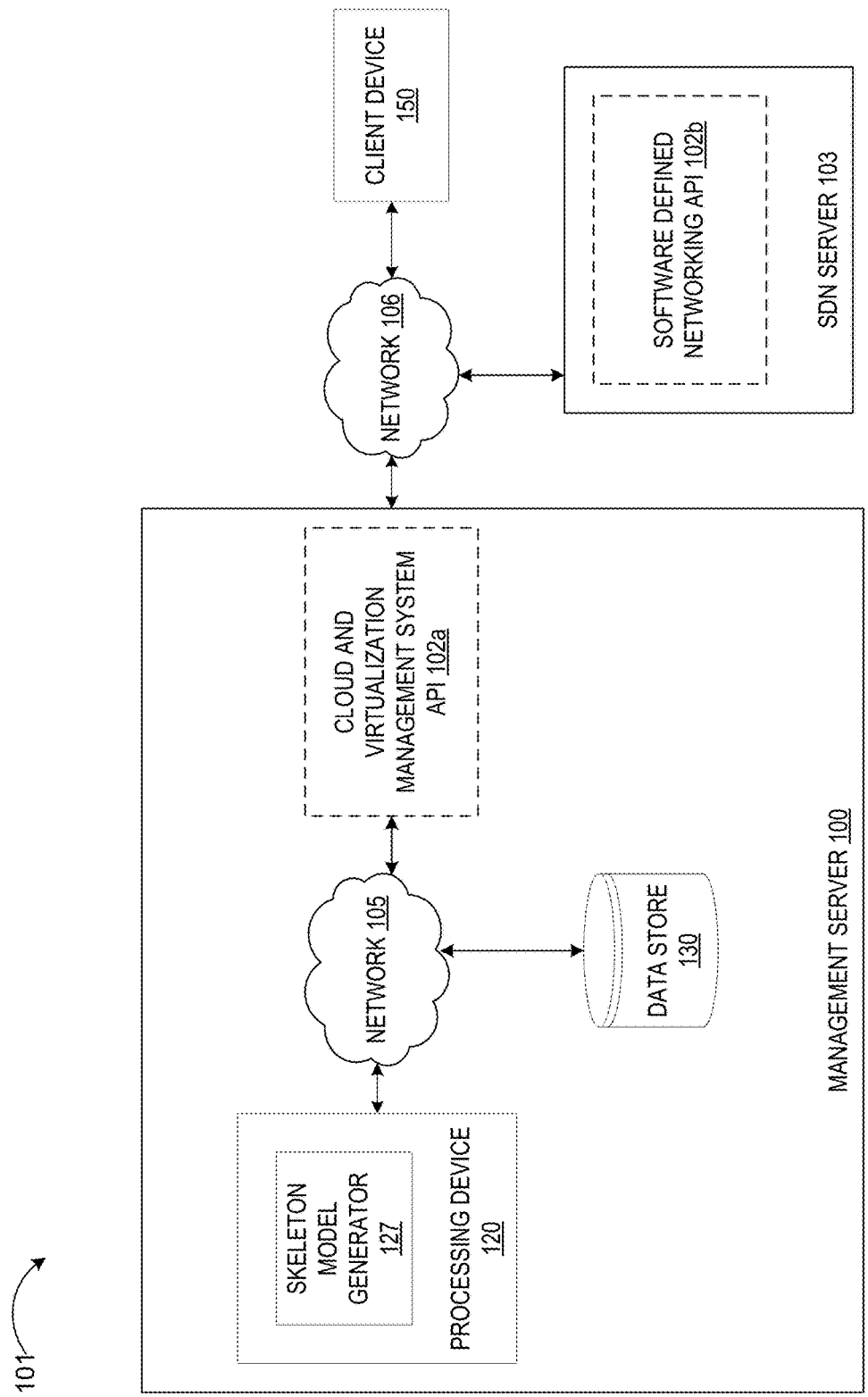
FIG. 1 is a block diagram that illustrates an example API converter system, in accordance with some embodiments of the present disclosure.

A web application (also referred to herein as a web app) may be an application that uses a client-server model where the user interface of the application is presented by a web browser of a client device and where the actions, operations, functions, methods, calculations, etc., of the web application are generally performed by a server computing device. The web application may be divided into multiple components, which may be referred to as web application components or micro applications. Each web application component may perform different functions, operations, actions, processes, methods, etc., for a web application and/or may provide different services, functionalities, and/or resources for the web application.

In one embodiment, a representational state transfer (REST) application program interface (API) may provide operations to perform create, remove, update, and delete (CRUD) operations on a remote server (e.g., a server hosting a web application). In one embodiment, REST is an architectural style that defines a set of constraints and properties based on HTTP. Web Services that conform to the REST architectural style, or RESTful web services, may provide interoperability between computer systems on the Internet. REST-compliant web services may allow the requesting systems to access and manipulate textual representations of web resources by using a uniform and predefined set of stateless operations.

In cloud virtualization management systems (such as RHEV, OpenStack, etc.) there is often a need to integrate with external SDN systems to provide advanced networking functions (e.g., forwarding, data collecting and processing, etc.). SDN systems may facilitate network management and enable programmatically efficient network configuration in order to improve network performance and monitoring in cloud virtualization management systems. In one embodiment, cloud virtualization systems may include machine resources (e.g., abstracted by software) and allocated into centralized pools. Often the API between the management system and the SDN controller do not match precisely and a lot of "glue" code is necessary to provide the translations between the two APIs (of the management system and the SDN controller), as terms and protocols between the two systems may not be the same.

In one embodiment, the glue code may be generated by hand. The process of generating the glue code can be very time consuming and error prone, as it is done manually by developers that have to reconcile the API differences in code. This process generally requires extensive knowledge of the underling API data, its structure, types, accessors, mutators, endpoints, and validations rules. In one embodiment, one way to get this information is through manually-produced documentation, reading and deciphering server-side code, and/or conducting conversations with the original developer of the API. Such a solution may be time-consuming and inefficient.

The present disclosure addresses the above-noted and other deficiencies by using a processing logic to map resources, relationships, and fields from the management system API to the SDN API. In one embodiment, a resource is an object with a type, associated data, relationships to other resources, and a set of methods that operate on it. In one embodiment, resources do not exist in isolation, but have relationships to other resources. Sometimes these relationships exist between the mapped objects in the application data model, and sometimes they are specific to the RESTful resources. In one embodiment, fields refer to fillable input fields. A fillable input field may include an attribute (e.g., "name") and a description (e.g., "The field name").

The processing logic runs over the REST APIs (and can be adapted to other technologies, including APIs other than REST APIs and systems other than SDNs) of an instance of the live system from each side (e.g., the management side and the SDN side), and discover the different resources involved, their relationships, and the fields comprising them. The processing logic can be fed a single or multiple top level entry points from which it will perform a deep scanning of the available resources, and create a "skeleton model" of the different entity types. This skeleton model can be provided to a client device via an API and/or a GUI, which may allow for changes to be made to the generated skeleton model.

Advantageously, by automatically generating, by processing logic, the skeleton model bridging a management system API and an SDN API, the efficiency and ease associated with the generation (either automatically or through some level of human interaction) of APIs and GUIs associated with APIs may be greatly improved. Such a skeleton model may allow for efficient and precise communication between a management system API and an SDN API (or some other external API).

FIG. 1 is a block diagram that illustrates an example API converter system 101, in accordance with some embodiments of the present disclosure. As discussed above, a web application may be an application that uses a client-server model where the user interface of the application is presented by a web browser of a client device of a user and where actions, operations, functions, methods, calculations, etc., of the web application are generally performed by a server computing device. The web application may be provided by a management server 100 and/or SDN server 103. Servers 100, 103 may include various components, which may allow a web application to run on a server device or client device. Each component may perform different functions, operations, actions, processes, methods, etc., for a web application and/or may provide different services, functionalities, and/or resources for the web application. Server 100 may include a cloud and virtualization management system application program API 102a to provide access to an application of server 100. Server 103 may include an SDN API 102b to provide access to an application of server 100. In one embodiment, APIs 102a, 102b may include any number of endpoints, which may allow a client device to access the various functions, operations, actions, processes, and methods provided by the APIs 102a, 102b.

In one embodiment, the servers 100, 103 may host web applications. For example, different components of servers 100, 103 may be located on and/or may execute on different processing devices (e.g., processing device 120) of the server 100, as discussed in more detail below. In one embodiment, skeleton model generator 127 may be implemented on processing device 120 of server 100.

As illustrated in FIG. 1, server 100 includes an API 102, a computing processing device 120, a data store 130, and a network 105. The API 102, the processing device 120, and the data store 130 is coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 100. The data store 130 may be a persistent storage that is capable of storing data (e.g., a library of skeleton models, as described herein). A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The servers 100, 103 may comprise any suitable type of computing device or machine that has a programmable processor including, for example, server computers, desktop computers, laptop computers, tablet computers, smartphones, set-top boxes, etc. In some examples, the servers 100, 103 may comprise a single machine or may include multiple interconnected machines (e.g., multiple servers configured in a cluster). The servers 103 may be implemented by a common entity/organization or may be implemented by different entities/organizations. For example, a server 100 may be operated by a first company/corporation and a second server 103 may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

As discussed herein, the server 100 may provide a skeleton model bridging API 102a and API 102b to client devices (e.g., client device 150) to aid in the communication between server 100 and server 103. In one embodiment, server 100 is operably connected to client device 150 and to SDN server 103 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a wireless fidelity (WiFi) hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Further implementation details of the operations performed by system 101 are described with respect to FIGS. 2-6.

Figure 2:
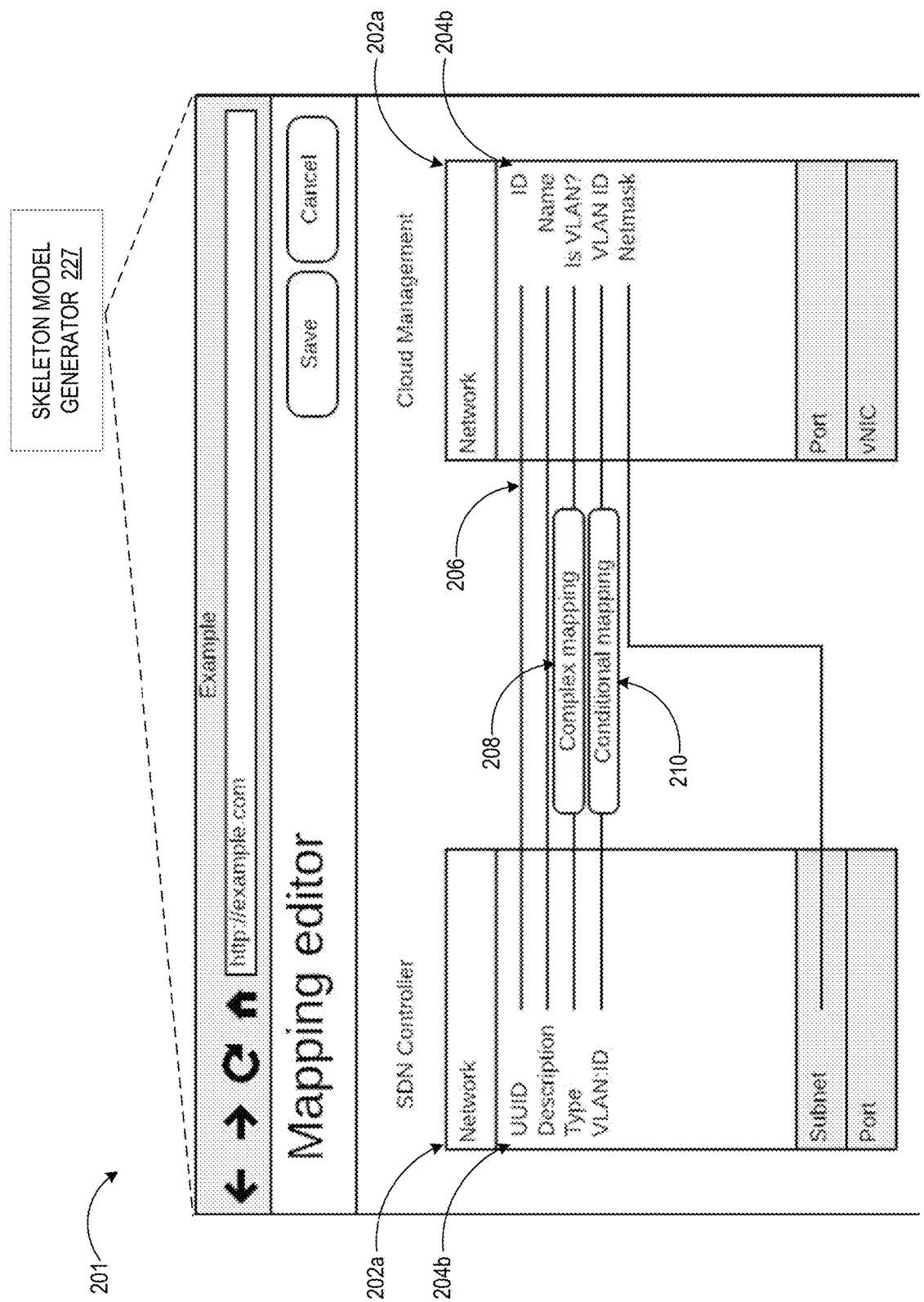
FIG. 2 is a block diagram that illustrates an example API convertor graphical user interface (GUI), in accordance with some embodiments of the present disclosure.

FIG. 2 is a block diagram that illustrates an example API convertor graphical user interface (GUI) 201, in accordance with some embodiments of the present disclosure. In one embodiment, the skeleton model generator 227 is the skeleton model generator 127 of FIG. 1. The operations and functionality of skeleton model generator 227 may be provided by a processing device of a server hosting an application (e.g., processing device 120 of server 100 of FIG. 1). In one embodiment, the skeleton model generator 227 may identify a cloud and virtualization management system API (e.g., API 202b) and identify an SDN API (e.g., API 202a) for which to generate a skeleton model. Skeleton model generator 227 may determine one or more resources, relationships, or fields corresponding to the cloud and virtualization management system API and the SDN API (204b and 204a of API 202b and API 202a, respectively).

Skeleton model generator 227 may then generate a skeleton model representing mappings between the one or more resources, relationships, or fields 204b, 204a corresponding to the cloud and virtualization management system API 202b and the SDN API 202a. In one embodiment, the skeleton model may include various mapping types, including but not limited to simple mappings (e.g., 206), complex (advanced) mappings (e.g., 208), and conditional mappings (e.g., 210), as described herein.

Skeleton model generator 227 can provide the skeleton model to a client device for display. In one embodiment, the skeleton model may be displayed as a GUI, such as GUI 201. In another embodiment, the skeleton model may be displayed as and API. Both the GUI and the API may allow for a user to make modify and save the skeleton model in a library (e.g., database) of skeleton models.

Figure 3:
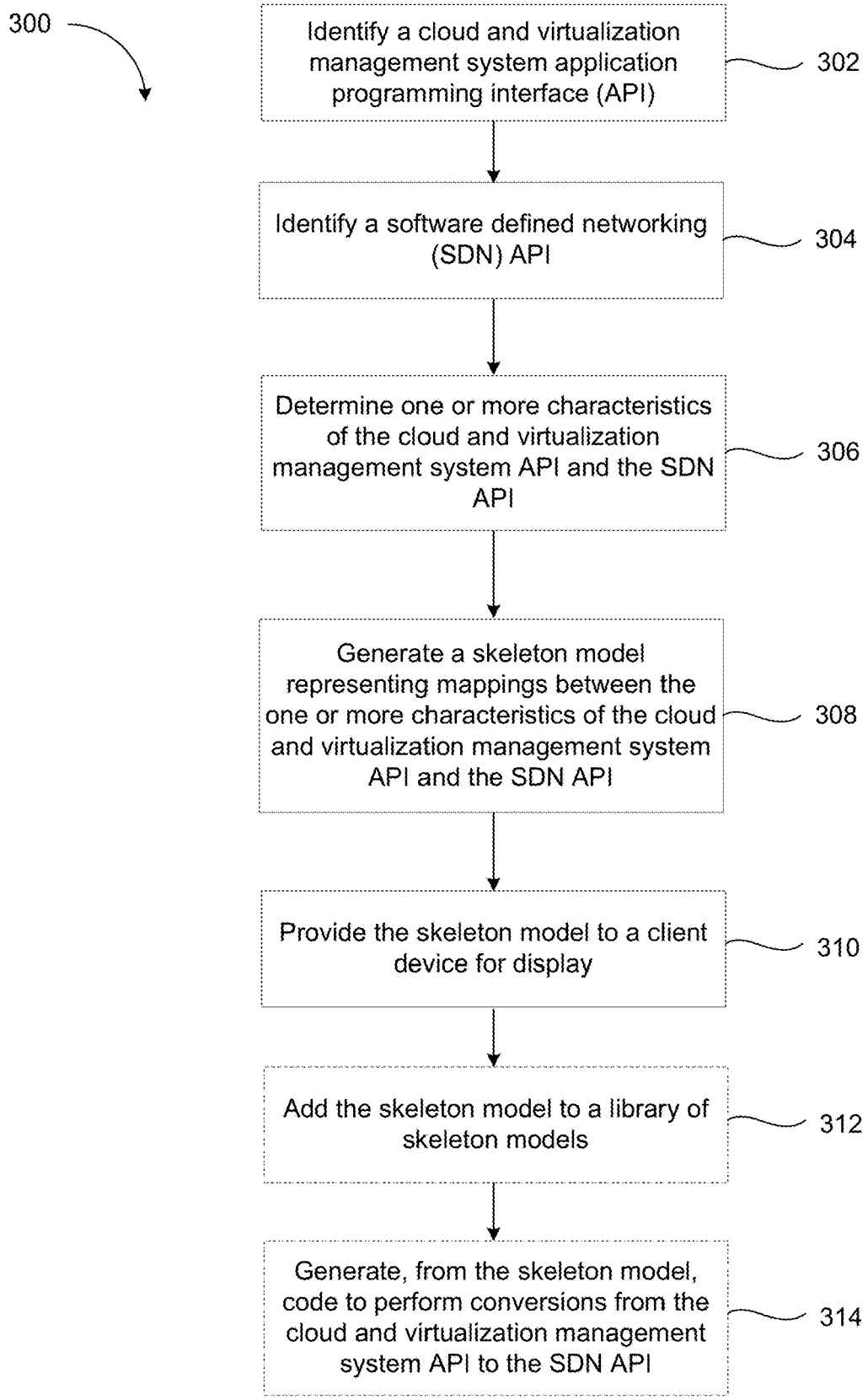
FIG. 3 is a flow diagram of a method of cloud software defined networking (SDN) API conversion, in accordance with some embodiments of the present disclosure.

FIG. 3 is a flow diagram 300 of a method of cloud SDN API conversion, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 3, at block 302 processing logic identifies a cloud and virtualization management system API and at block 304, processing logic identifies an SDN API. In one embodiment, the cloud and virtualization management system may be a cloud management system. In another embodiment, the cloud and virtualization management system may be a virtualization management system. In yet another embodiment, the cloud and virtualization management system may any other suitable management system having an API.

At block 306, processing logic determines, by a processing device, one or more characteristics (e.g., resources, relationships, or fields) of the cloud and virtualization management system API and the SDN API. In one embodiment, each of the APIs may have corresponding resources, relationships, and associated fields (e.g. characteristics). In some cases, the respective resources, relationships, and associated fields may not match from one API to the other. In such a case, it is advantageous to generate a skeleton model that maps the respective resources, relationships, and associated fields from one API to the other API.

At block 308, processing logic may generate, by the processing device, the skeleton model representing mappings between the one or more characteristics (e.g., resources, relationships, or fields) of the cloud and virtualization management system API and the SDN API. In one embodiment, to generate the skeleton model, processing logic may query an internal or external (to the system) database containing documentation that corresponds to one or more of the APIs. Processing logic may automatically pull information from the database to aid in the generation of the skeleton model. At block 310, processing logic may provide the skeleton model to a client device for display.

Optionally, at block 312, processing logic may add the skeleton model to a library of skeleton models (e.g., in a file or database). Also optionally, processing logic may use the skeleton model to generate code to perform conversions according to the mapping rules defined by the skeleton model (block 314). The generated code exposes the SDN API so that various operations (create, read, update, delete, etc.) can be performed. Processing logic may be configured to receive and return the resources in the structure expected by the calling system, while internally the mapping rules may be used to generate the code to translate the resources into the structure expected by the SDN.

Figure 4A:
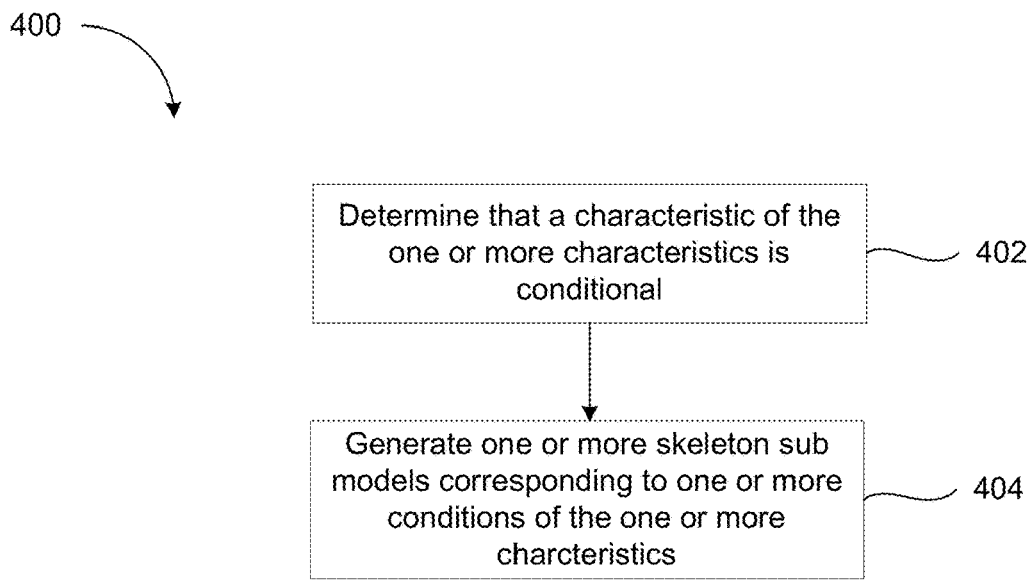
FIG. 4A is a flow diagram of a method of generating skeleton sub models for a cloud SDN API conversion, in accordance with some embodiments of the present disclosure.

FIG. 4A is a flow diagram of a method 400 of generating skeleton sub models for a cloud SDN API conversion, in accordance with some embodiments of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 4A, at block 402, processing logic determines that a characteristic (e.g., resource) of the one or more characteristics is conditional and at block 404, processing logic generates one or more skeleton sub models corresponding to one or more conditions of the one or more characteristics.

In one embodiment, the conditional mapping may not be determined automatically by the system, but instead the user that edits the mapping can see that certain fields from the source aren't mapped to the destination, and could specify a conditional mapping between them. For example, a network may contain a VLAN ID that may be mapped. In this case, the condition for the mapping could be "Is the network type VLAN" and only if the condition is true, then the field would be mapped to the corresponding VLAN ID. In another embodiment, if the mapping logic detects that a field sometimes appears and other times doesn't, the logic may mark the field as conditional, and may try to match it to a field on the other side (but the condition may be specified by the user).

Figure 4B:
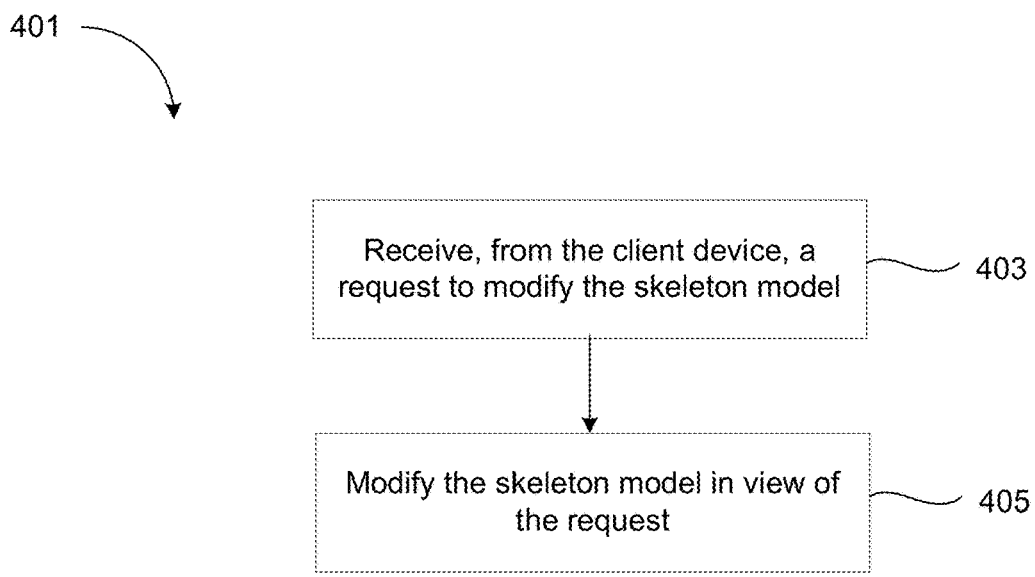
FIG. 4B is a flow diagram of a method of modifying a skeleton models for a cloud SDN API conversion, in accordance with some embodiments of the present disclosure.

FIG. 4B is a flow diagram of a method 401 of modifying a skeleton models for a cloud SDN API conversion, in accordance with some embodiments of the present disclosure. The method 401 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 4B, at block 403 processing logic receives, from a client device, a request to modify the skeleton model. In one embodiment the request may be received from an API. In another embodiment, the request may be received from a GUI. The request may include any number of directives, including but not limited to instructions to: modify a field of the skeleton model, generate a simple mapping between a first field in the virtualization management system API and a second field in the SDN API, or generate an advanced mapping between the first field in the virtualization management system API and the second field in the SDN API. In one embodiment, the advanced mapping triggers a code snippet between the first field and the second field. The request may also include instructions to generate a conditional mapping between the first field in the virtualization management system API and the second field in the SDN API. In one embodiment, the conditional mapping activates a mapping between the first field and the second field if a condition is satisfied. The request may also include instructions to mark a mapping as bi-directional or provide counter-mapping rules for certain conditions.

In one embodiment, if the mapping is not a simple mapping, a counter mapping rule might be provided. For example, if the network on the SDN controller has a type field which may contain the values "flat, vlan, vxlan, gre, and geneve" but the virtualization management system only supports the "flat and vlan" types, then the complex mapping may be a script that compares the type and outputs a Boolean, which may be mapped to the "is_vlan" field on the other side. Then, in the reverse direction, there may be some counter mapping (e.g., conditional mapping in this case) which sets type "flat" if "is_vlan" is false, or type "vlan" if "is_vlan" is true. At block 405, processing logic modifies the skeleton model in view of the request.

Figure 5:
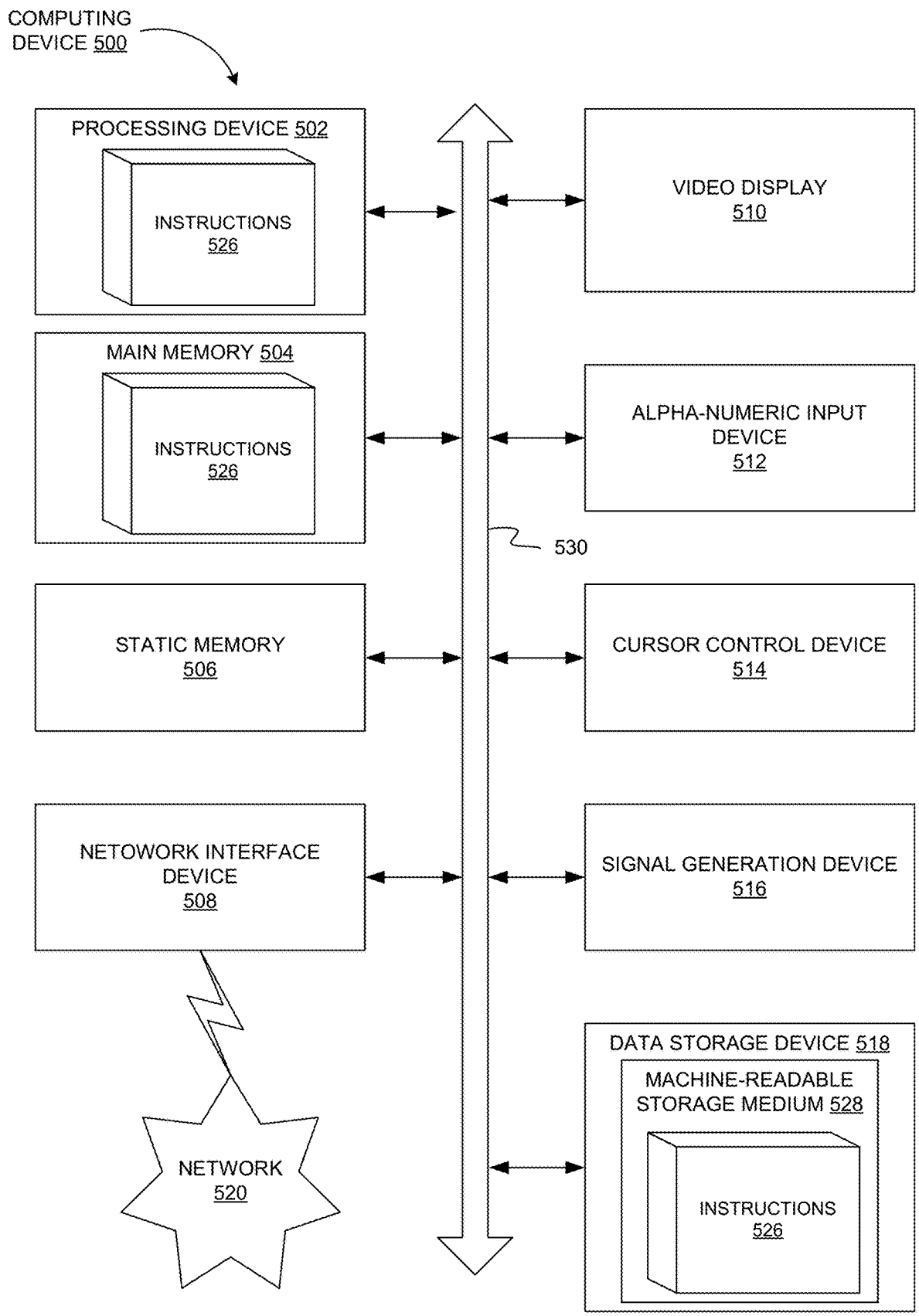
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein. In one embodiment, processing device 502 represents processing device 120 of FIG. 1. In another embodiment, processing device 502 represents a processing device of a client device (e.g., client device 150 of FIG. 1).

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. Instructions implementing module 526 may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 6:
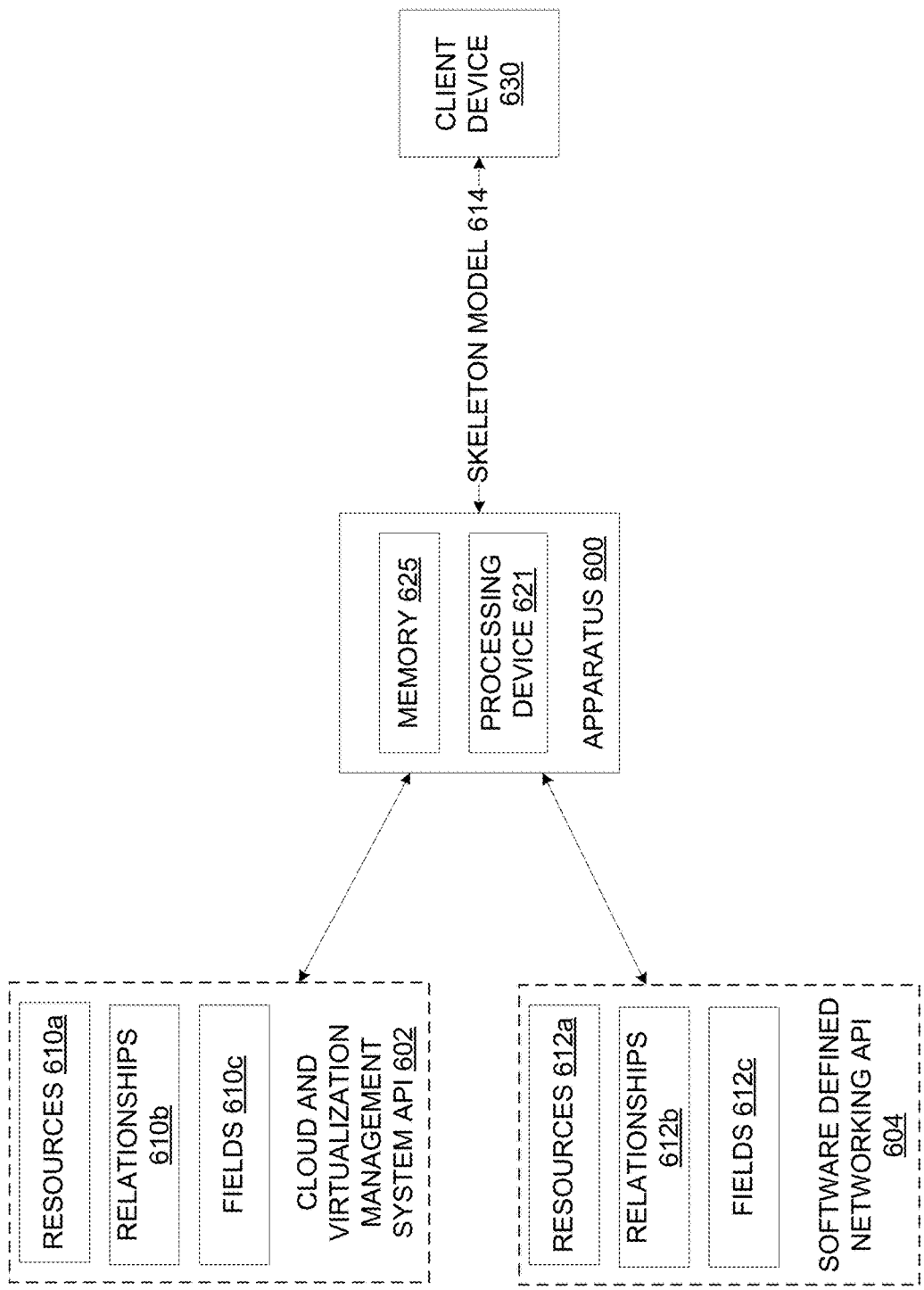
FIG. 6 is a block diagram of an example apparatus that may perform one or more of the operations described herein, in accordance with some embodiments.

FIG. 6 is a block diagram of an example apparatus 600 that may perform one or more of the operations described herein, in accordance with some embodiments. The apparatus 600 includes a memory 625 to skeleton models associated with APIs 602, 604. The apparatus 600 also includes a processing device 621 operatively coupled to the memory. The processing device 621 may identify a cloud and virtualization management system API 602 and a software defined networking (SDN) API 604. The processing device may determine one or more resources, relationships, or fields (610*a*, 610*b*, 610*c*, 612*a*, 612*b*, and 612*c*) corresponding to the cloud and virtualization management system API 302 and the SDN API 604.

Processing device 621 may generate a skeleton model 614 representing mappings between the one or more resources, relationships, or fields (610*a*, 610*b*, 610*c*, 612*a*, 612*b*, and 612*c*) corresponding to the cloud and virtualization management system API 602 and the SDN API 604. Processing device 621 may provide the skeleton model 614 to the client device 630 for display.

Unless specifically stated otherwise, terms such as "identifying," "determining," "generating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   identifying a cloud and virtualization management system application programming interface (API);
   identifying a software defined networking (SDN) API;
   determining, by a processing device, one or more characteristics of the cloud and virtualization management system API and the SDN API;
   generating, by the processing device, a skeleton model representing mappings between the one or more characteristics of the cloud and virtualization management system API and the SDN API;

receiving, from the client device, a request to modify a field of the skeleton model;

modifying the skeleton model in view of the request; and providing the skeleton model to a client device for display.

2. The method of claim 1, wherein the skeleton model is displayed via at least one of: an API or a graphical user interface (GUI).

3. The method of claim 1, further comprising generating, from the skeleton model, code to perform conversions from the cloud and virtualization management system API to the SDN API, according to one or more mapping rules defined by the skeleton model.

4. The method of claim 1, further comprising adding the skeleton model to a library of skeleton models.

5. The method of claim 1, wherein one or more of the cloud and virtualization management system API or the SDN API is a representational state transfer (REST) API.

6. The method of claim 1, further comprising:

determining that a characteristic of the one or more characteristics is conditional; and generating one or more skeleton sub models corresponding to one or more conditions of the one or more characteristics.

7. The method of claim 1, wherein generating the skeleton model comprises detecting cyclical references.

8. The method of claim 1, wherein the request to modify the skeleton comprises at least one of a request to:

generate a simple mapping between a first field in the virtualization management system API and a second field in the SDN API, generate an advanced mapping between the first field in the virtualization management system API and the second field in the SDN API, wherein the advanced mapping triggers a code snippet between the first field and the second field, or generate a conditional mapping between the first field in the virtualization management system API and the second field in the SDN API, wherein the conditional mapping activates a mapping between the first field and the second field if a condition is satisfied, or mark a mapping as bi-directional.

9. An apparatus, comprising:

a memory; and a processing device operatively coupled to the memory, the processing device to:

identify a cloud and virtualization management system application programming interface (API);

identify a software defined networking (SDN) API;

determine one or more characteristics of the cloud and virtualization management system API and the SDN API;

generate a skeleton model representing mappings between the one or more characteristics of the cloud and virtualization management system API and the SDN API;

receive, from the client device, a request to modify a field of the skeleton model;

modify the skeleton model in view of the request; and provide the skeleton model to a client device for display.

10. The apparatus of claim 9, wherein the skeletons are displayed via an API or a graphical user interface (GUI).

11. The apparatus of claim 9, wherein the processing device is further to add the skeleton model to a library of skeleton models.

12. The apparatus of claim 9, wherein one or more of the cloud and virtualization management system API or the SDN API is a representational state transfer (REST) API.

13. The apparatus of claim 9, wherein the processing device is further to:

determine that a characteristic of the one or more characteristics is conditional; and generate one or more skeleton sub models corresponding to one or more conditions of the one or more characteristics.

14. The apparatus of claim 9, wherein the one or more characteristics comprise one or more resources, relationships, or fields.

15. The apparatus of claim 9, wherein the request to modify the skeleton comprises at least one of a request to:

modify a field of the skeleton model, generate a simple mapping between a first field in the virtualization management system API and a second field in the SDN API, generate an advanced mapping between the first field in the virtualization management system API and the second field in the SDN API, wherein the advanced mapping triggers a code snippet between the first field and the second field, or generate a conditional mapping between the first field in the virtualization management system API and the second field in the SDN API, wherein the conditional mapping activates a mapping between the first field and the second field if a condition is satisfied, or mark a mapping as bi-directional.

16. A non-transitory computer-readable storage medium including instructions that, when identify a cloud and virtualization management system application programming interface (API);

identify a software defined networking (SDN) API;

determine, by the processing device, one or more characteristics of the cloud and virtualization management system API and the SDN API;

generate, by the processing device, a skeleton model representing mappings between the one or more characteristics of the cloud and virtualization management system API and the SDN API;

receive, from the client device, a request to modify a field of the skeleton model;

modify the skeleton model in view of the request; and provide the skeleton model to a client device for display.

17. The non-transitory computer-readable storage medium of claim 16, wherein the request to modify the skeleton comprises at least one of a request to:

generate a simple mapping between a first field in the virtualization management system API and a second field in the SDN API, generate an advanced mapping between the first field in the virtualization management system API and the second field in the SDN API, wherein the advanced mapping triggers a code snippet between the first field and the second field, or generate a conditional mapping between the first field in the virtualization management system API and the second field in the SDN API, wherein the conditional mapping activates a mapping between the first field and the second field if a condition is satisfied, or mark a mapping as bi-directional.

* * * * *